(12) United States Patent
Albrecht et al.

(10) Patent No.: US 10,654,193 B2
(45) Date of Patent: *May 19, 2020

(54) METHODS AND SYSTEM FOR CONTROLLING A SURFACE PROFILE OF A WAFER

(71) Applicant: GlobalWafers Co., Ltd, Hsinchu (TW)

(72) Inventors: Peter D. Albrecht, O'Fallon, MO (US); Carlos Zavattari, Varallo Pombia (IT); Sumeet S. Bhagavat, St. Charles, MO (US); Vandan Tanna, O'Fallon, MO (US); Uwe Hermes, Portland, OR (US)

(73) Assignee: GlobalWafers Co., Ltd., Hsinchu, Taiwan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/414,238

(22) Filed: May 16, 2019

(65) Prior Publication Data

US 2019/0270222 A1 Sep. 5, 2019

Related U.S. Application Data

(63) Continuation of application No. 15/247,099, filed on Aug. 25, 2016, now Pat. No. 10,315,337.

(51) Int. Cl.
| | |
|---|---|
| *B28D 5/00* | (2006.01) |
| *B28D 5/04* | (2006.01) |
| *B23D 57/00* | (2006.01) |
| *B28D 1/00* | (2006.01) |
| *G05B 19/402* | (2006.01) |
| *G05B 19/042* | (2006.01) |

(52) U.S. Cl.
CPC ....... *B28D 5/0064* (2013.01); *B23D 57/0023* (2013.01); *B28D 1/005* (2013.01); *B28D 5/045* (2013.01); *G05B 19/042* (2013.01); *G05B 19/0426* (2013.01); *G05B 19/402* (2013.01); *G05B 2219/2602* (2013.01); *G05B 2219/45031* (2013.01); *G05B 2219/45043* (2013.01); *G05B 2219/50285* (2013.01)

(58) Field of Classification Search
None
See application file for complete search history.

(56) References Cited

U.S. PATENT DOCUMENTS

| | | | | |
|---|---|---|---|---|
| 5,778,869 | A * | 7/1998 | Toyama | ............. B23D 57/0053 125/16.02 |
| 6,065,461 | A | 5/2000 | Asakawa et al. | |
| 8,167,681 | B2 | 5/2012 | Oishi et al. | |

(Continued)

FOREIGN PATENT DOCUMENTS

WO 2013011451 A2 1/2013

*Primary Examiner* — Cory W Eskridge
(74) *Attorney, Agent, or Firm* — Armstrong Teasdale LLP

(57) ABSTRACT

Methods for controlling the surface profiles of wafers sliced from an ingot with a wire saw include measuring an amount of displacement of a sidewall of a frame of the wire saw. The sidewall is connected to a bearing of a wire guide supporting a wire web in the wire saw. Based on the measured amount of displacement of the sidewall, a pressure profile for adjusting a position of the sidewall is determined by a computing device. Pressure is applied to the sidewall using a displacement device according to the determined pressure profile to control the position of the sidewall.

22 Claims, 14 Drawing Sheets

(56) References Cited

U.S. PATENT DOCUMENTS

| | | |
|---|---|---|
| 8,567,384 B2 | 10/2013 | Oishi et al. |
| 10,315,337 B2 * | 6/2019 | Albrecht ............. B28D 5/0064 |
| 2010/0037881 A1 | 2/2010 | Oishi et al. |
| 2013/0139800 A1 | 6/2013 | Zavattari et al. |
| 2013/0139801 A1 | 6/2013 | Zavattari et al. |
| 2013/0144420 A1 | 6/2013 | Zavattari et al. |
| 2013/0144421 A1 | 6/2013 | Zavattari et al. |
| 2013/0174828 A1 | 7/2013 | Zavattari et al. |

\* cited by examiner

METHODS AND SYSTEM FOR CONTROLLING A SURFACE PROFILE OF A WAFER

CROSS REFERENCE TO RELATED APPLICATION

This application is a continuation application of U.S. application Ser. No. 15/247,099, which was filed Aug. 25, 2016, and which is hereby incorporated by reference in its entirety.

FIELD

This disclosure relates generally to wire saws used to slice ingots into wafers and, more specifically, to methods and systems for controlling wire saw frame displacement to control a surface profile of a wafer sliced from an ingot by a wire saw.

BACKGROUND

Semiconductor wafers are typically formed by cutting an ingot with a wire saw. These ingots are often made of silicon or other semiconductor or solar grade material. The ingot is connected to a structure of the wire saw by a bond beam and an ingot holder. The ingot is bonded with adhesive to the bond beam, and the bond beam is in turn bonded with adhesive to the ingot holder. The ingot holder is connected by any suitable fastening system to the wire saw structure.

In operation, the ingot is contacted by a web of moving wires in the wire saw that slice the ingot into a plurality of wafers. The bond beam is then connected to a hoist and the wafers are lowered onto a cart.

Wafers cut by known saws may have surface defects that cause the wafers to have a surface profile or warp that deviates from set standards. In order to ameliorate the deviating wafer warp, such wafers may be subject to additional processing steps. These steps are time-consuming and costly. Moreover, known wire saws are not operable to adjust the shape and/or warp of the surfaces of the wafers cut from the ingot by the wire saws due to frame displacement of the wire saw. Thus, there exists a need for a more efficient and effective system to control the surface profile or warp of wafers cut in a wire saw.

This section is intended to introduce the reader to various aspects of art that may be related to various aspects of the disclosure, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

SUMMARY

In one aspect, a method for controlling a surface profile of a wafer sliced from an ingot with a wire saw includes measuring an amount of displacement of a sidewall of a frame of the wire saw, where the sidewall is connected to a bearing of a wire guide supporting a wire web in the wire saw. The method further includes storing the measured amount of displacement of the sidewall as displacement data, determining a pressure profile for adjusting a position of the sidewall based on the stored displacement data of the sidewall, and applying pressure to the sidewall with a displacement device according to the determined pressure profile to control the position of the sidewall.

In another aspect, a method for controlling a surface profile of a wafer during a cutting operation of an ingot includes initiating the cutting operation on the ingot using a wire saw to produce the wafer, and measuring, in real-time during the cutting operation, an amount of displacement of a sidewall of a frame of the wire saw, where the sidewall is connected to a bearing of a wire guide supporting a wire web in the wire saw. The method further includes determining, in real-time during the cutting operation, an amount of pressure for adjusting a position of the sidewall based on the measured amount of displacement of the sidewall, and applying, in real-time during the cutting operation, the determined amount of pressure to the sidewall with a displacement device. The application of the determined amount of pressure facilitates counteracting the measured amount of displacement of the sidewall.

In yet another aspect, a system for controlling a surface profile of a wafer sliced from an ingot with a wire saw includes a sensor for measuring an amount of displacement of a sidewall of a frame of the wire saw, a displacement device connected to the sidewall, and a computing device connected in communication to the sensor and the displacement device. The sidewall is connected to a bearing of a wire guide supporting a wire web in the wire saw. The computing device includes a memory and a processor, and is configured to store, in the memory, the measured amount of displacement of the sidewall as displacement data, determine a pressure profile for adjusting a position of the sidewall based on the stored displacement data of the sidewall, and transmit a control signal to the displacement device to apply pressure to the sidewall with the displacement device according to the determined pressure profile to control the position of the sidewall.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Methods and systems described are usable to control the shape or surface profile, and thus the warp, of wafers sliced from an ingot by a wire saw. Surface profile of the wafers is controlled, for example, by controlling displacement of a frame of the wire saw, which supports wire guides of the wire saw. The frame displacement is controlled by measuring a displacement of a sidewall of the frame of the wire saw and using displacement devices to push or pull the sidewall of the wire saw frame to counteract the measured displacement. In addition, to fine tune the counteracting displacement, displacement of bearings supporting the wire guides of the wire saw is measured with respect to the sidewall of the frame. Additional displacement devices are used to push or pull the bearings to facilitate counteracting the measured displacement. The control of the displacement devices can be a predictive control process or a reactive control process.

The predictive control process is based on an historical performance of the wire saw. A direction and magnitude of the sidewall movement is predicted based on historical measurements. Displacement device pressure profiles for correcting the predicted displacement are determined based on this historical data. The reactive control process is based on a real-time performance of the wire saw. The direction and magnitude of the sidewall movement is measured in real-time during a cutting operation. Displacement device pressure profiles for correcting the measured displacement in real-time are determined to actively counteract the measured displacement of the sidewalls. Some methods and systems described herein include a controller used to store/retrieve the measured amount of displacement to determine the pressure profiles for adjusting the position of the sidewalls, which corresponds to desired surface profiles of the wafers. Thus, embodiments of the methods and systems described herein are operable to counteract displacement of the frame and/or bearings of the wire saw to control the surface profile of the wafers being cut from an ingot by the wire saw using either predictive or reactive control processes.

As used herein, the phrases "surface profile" or "wafer surface profile" refer to both the warp and shape of the surfaces of wafers sliced from the ingot by the wire saw. The term "warp" refers to the difference between the maximum and the minimum distances of the median surface of a free, un-clamped wafer from a best fit reference plane. Warp may be used in reference to global or overall wafer warp, and local wafer warp. Global wafer warp refers to the warp of a wafer over the entire wafer surface. Local wafer warp refers to the warp of a wafer over a specific distance, such as within 10, 20, or 30 mm of an entry cut (also referred to as entry warp) or within 10, 20, or 30 mm of an exit cut (also referred to as exit warp).

Figure 1:
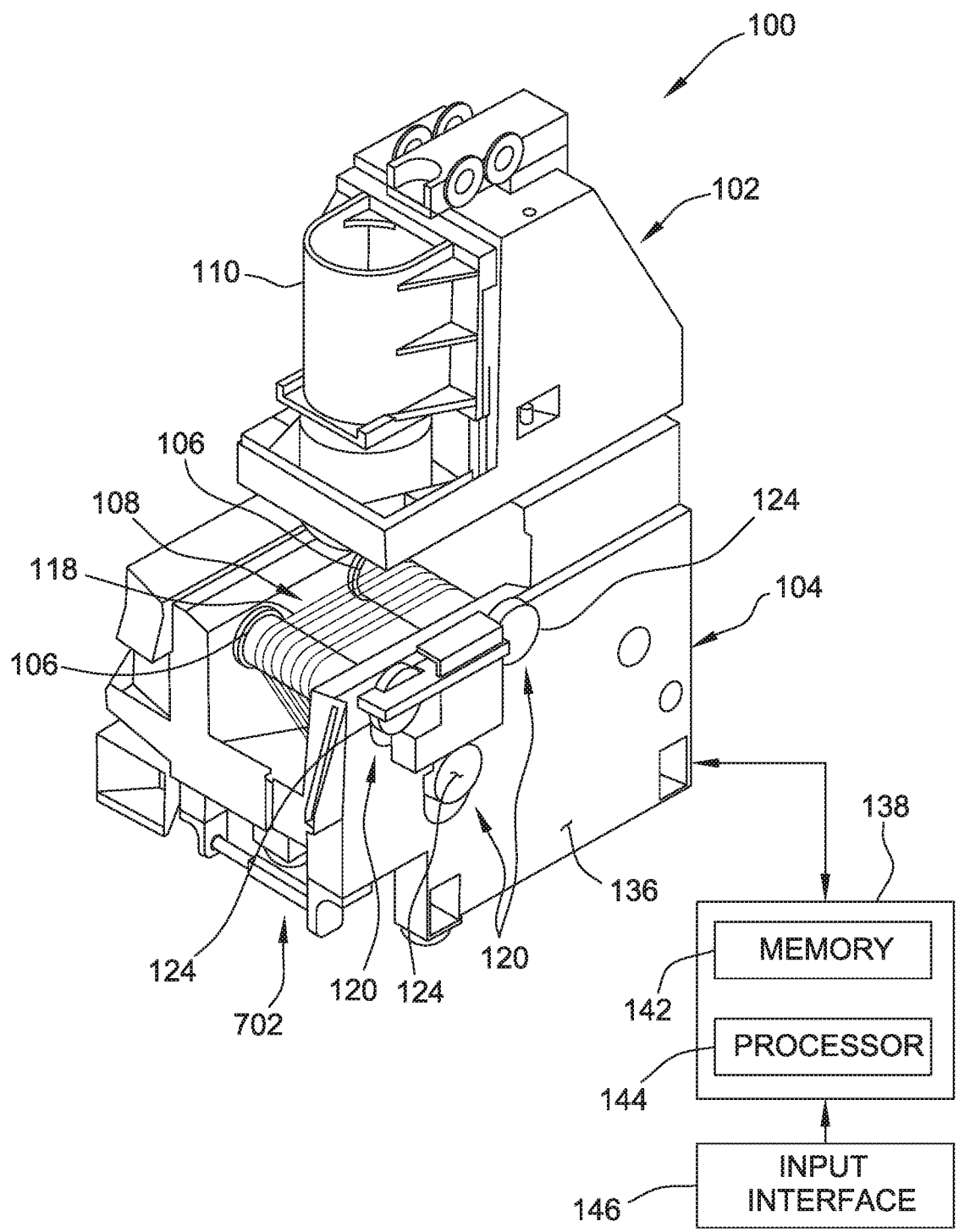
FIG. 1 is a partially schematic perspective of an example wire saw.
Figure 2:
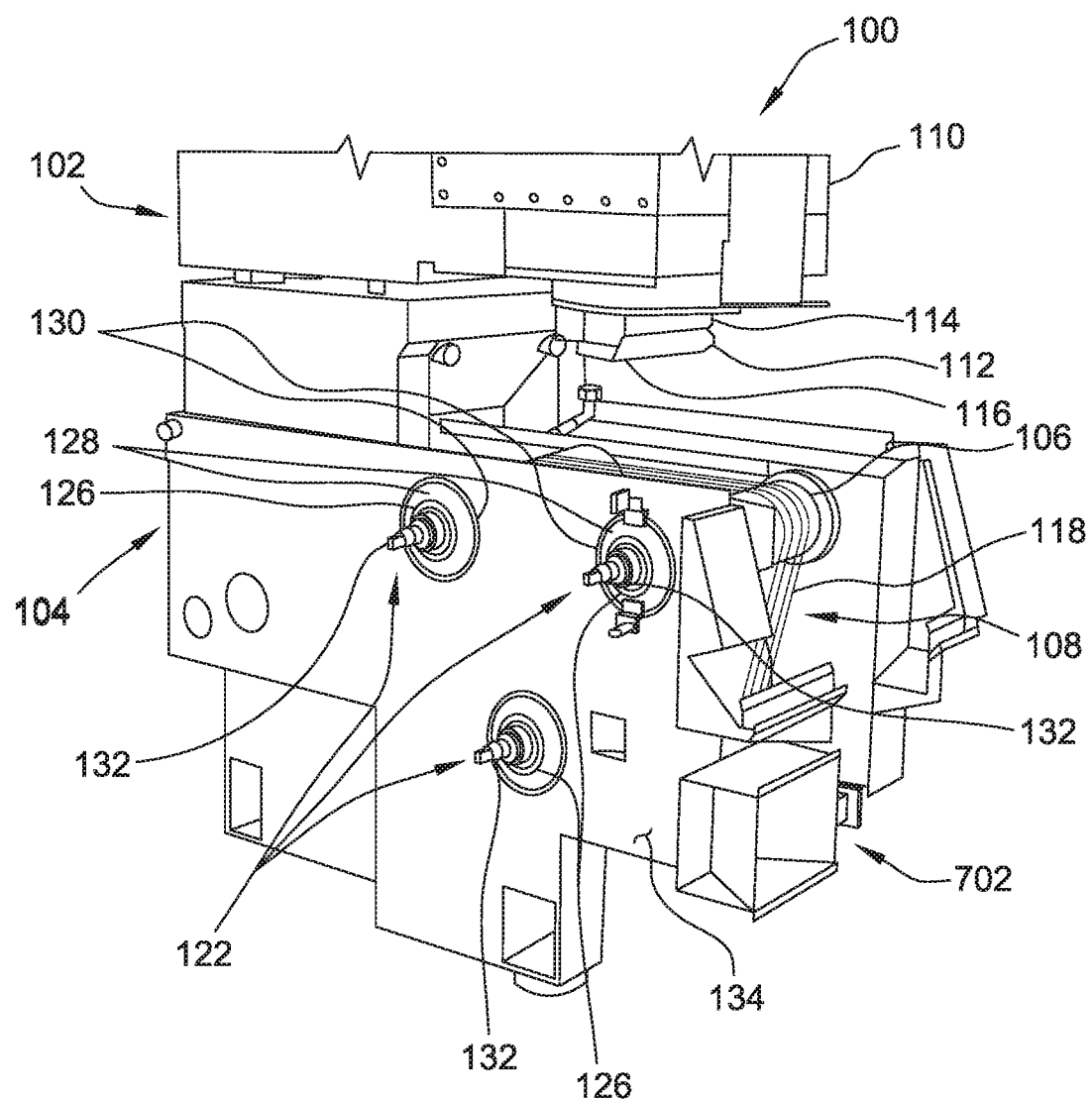
FIG. 2 is a second perspective view of the wire saw of FIG. 1.

Referring to the drawings, an example system, generally indicated at 100, for controlling the surface profile of a wafer (not shown) sliced from an ingot 506 (shown in FIG. 5) with a wire saw 102 is shown in FIGS. 1 and 2. It is noted that any suitable wire saw or wafer slicing apparatus may be utilized for slicing an ingot without departing from the scope of the present disclosure. In the example embodiment, the ingot 506 may be a semiconductor material (e.g., a single crystal or polycrystalline silicon) or a photovoltaic material. Alternatively, the wire saw 102 may be used to slice ingots of other materials into wafers.

In the example embodiment, the wire saw 102 generally includes a frame 104 that mounts three wire guides 106 for supporting a wire web 108. The frame 104 includes a movable slide or head assembly 110, which includes an ingot holder or clamping rail 112. The clamping rail 112 is attached to the head assembly 110 by a table 114. A bond beam 116 is adhered or bonded to the clamping rail 112, and the ingot 506 (shown in FIG. 5) is adhered or bonded to the bond beam 116, opposite the clamping rail 112. The surfaces of the bond beam 116 are bonded to the clamping rail 112 and the ingot 506 using, for example, any suitable adhesive. The head assembly 110 is movable relative to the frame 104 to facilitate forcing the ingot 506 into the wire web 108.

The wire web 108 traverses a circuitous path around the three wire guides 106 when slicing the ingot 506. The number of wires 118 shown in FIGS. 1 and 2 is for illustration only, having the number of wires 118 reduced for clarity, and the spacing, likewise, exaggerated for clarity. In the example embodiment, one or more of the wire guides 106 is connected to a drive source (not shown) for rotating the wire guides 106, and thus the wire web 108.

As shown in FIGS. 1 and 2, the wire guides 106 are generally cylindrical in shape and have a plurality of peripheral grooves (not shown) that receive respective wires 118, thus making up the wire web 108. The peripheral grooves are spaced at precise intervals, thereby defining the spacing between wires 118 and determining a thickness of the wafers sliced from the ingot 506.

In the example embodiment, each of the wire guides 106 has opposing ends 120 and 122 mounted between a movable bearing 124 and a fixed bearing 126. The movable bearings 124 and the fixed bearings 126 are attached to the frame 104 of the wire saw 102. The wire guides 106 are attached to the movable bearing 124 and a fixed bearing 126 via respective bearing spindles 132 (shown in FIG. 2) and 140 (shown in FIG. 4).

The fixed bearing 126 has an inner race 128 that is connected to a respective end 122 of the wire guide 106 via bearing spindle 132, and an outer race 130 that is connected to the frame 104. The inner race 128 rotates as the wire guide 106 to which it is connected rotates. Likewise, the outer race 130 does not appreciably move as the inner race 128 and wire guide 106 rotate. In the example embodiment, the fixed bearings 126 are tapered roller bearings, although in other embodiments they may be any other suitable type of bearing (e.g., ball bearings).

In the example embodiment, the movable bearing 124 is movable with respect to the frame 104 of the wire saw 102. The movable bearing has an inner race (not shown) that is connected to a respective end 120 of the wire guide 106 via an inner shaft or bearing spindle 140 (shown in FIG. 4), and an outer race (not shown) that is movably connected to the frame 104, allowing axial movement of wire guide 106. The inner race rotates as the wire guide 106 to which it is connected rotates. Likewise, the outer race does not appreciably move as the inner race and wire guide 106 rotate. As the frame 104 of the wire saw 102 moves or is displaced during cutting or slicing of the ingot 506, the wire guides 106 move with the frame due to mounting with fixed bearing 126. Movable bearing 124 accommodates the movement. In alternative embodiments, during cutting of the ingot 506, the wire guides 106 increase in temperature and expand from the fixed-bearing 126 in the direction of the movable bearing 124. Such movement of the wire guides 106 may displaces the wire web 108 with respect to the ingot 506.

In the example embodiments, only movable bearings 124 of the system 100 are movable while fixed bearings 126 are immovable relative to the frame 104. In other embodiments, this is not the case and movable bearings 124 and fixed bearings 126 on both sides of the system 100 may be movable and/or their displacements can be adjusted. Moreover, in some embodiments the immovable (i.e., fixed) bearings 126 may be subject to some degree of displacement during use of the wire saw 102 and thus their position can be controlled with systems and methods similar to or the same as those described herein.

In the example embodiment, the frame 104 of the wire saw 102 includes a fixed wall 134 and a movable wall 136, each interchangeably referred to herein as a sidewall of the frame 104. The fixed bearings 126 are attached to the fixed wall 134, and in particular, the outer race 130 is attached to the fixed wall 134. In addition, the movable bearings 124 are movably attached to the movable wall 136, and in particular, the outer race of the movable bearing is attached to the movable wall 136 such that movable bearing 136 can move relative to movable wall 136. The phrases "fixed wall" and "movable wall," as used herein, are merely descriptive of the wall corresponding to the fixed bearing and movable bearing, respectively. The phrases do not connote movement or lack of movement of the walls. It is noted that both fixed wall 134 and movable wall 136 can move with respect to wire saw 102.

Figure 3:
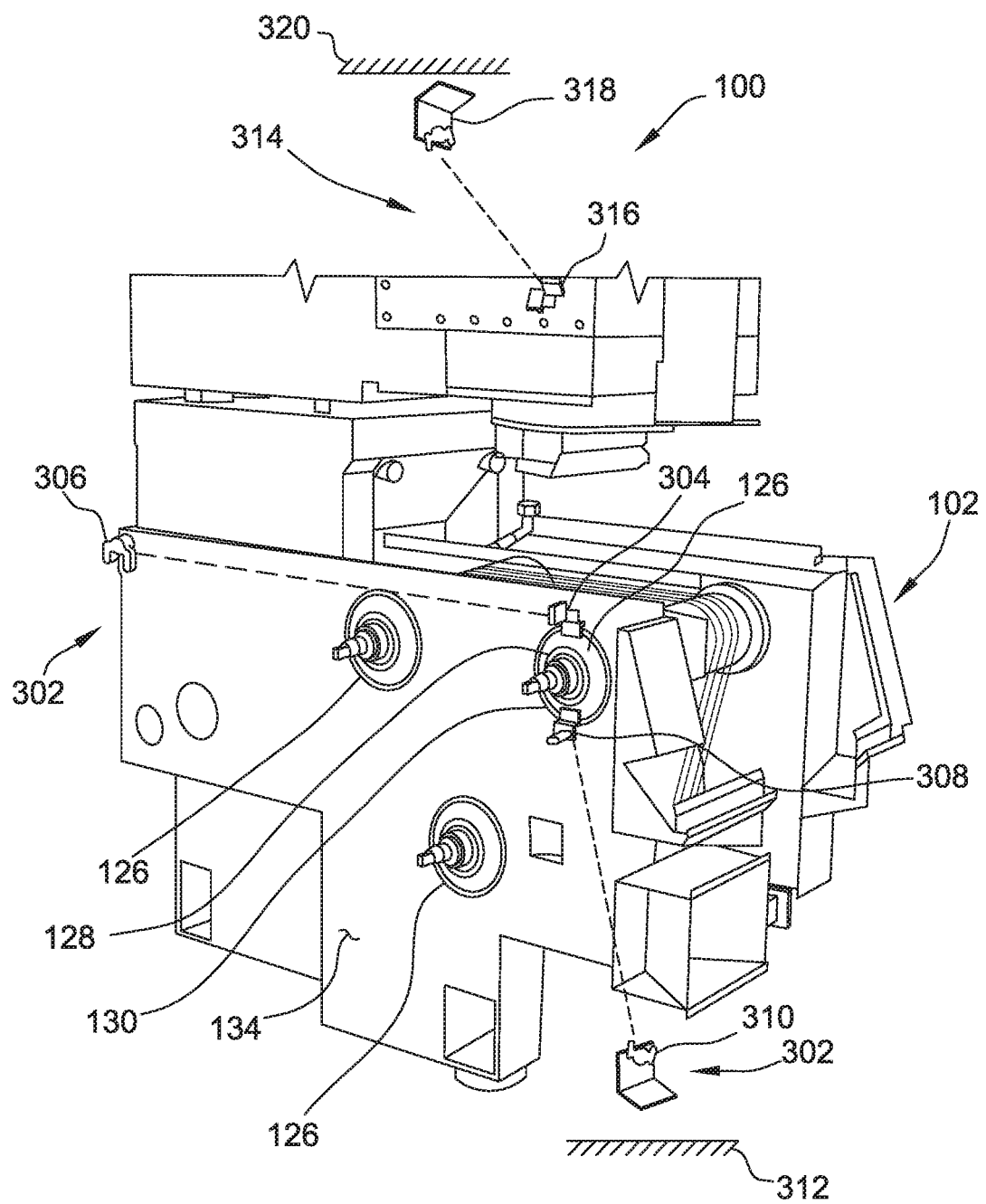
FIG. 3 is another perspective of the wire saw of FIG. 1.

FIG. 3 is a schematic perspective view of the second side of the wire saw 102, showing a plurality of displacement sensors. In the example embodiment, the system 100 for controlling the surface profile of a wafer includes at least one fixed bearing box displacement sensor system 302. For example, as shown in FIG. 3, the fixed bearing box displacement sensor system 302 includes a displacement sensor 304 (broadly, a "sensor") disposed adjacent the inner race 128 for measuring movement and/or axial displacement of the inner race 128. Likewise, another displacement sensor 308 is disposed adjacent the outer race 130 for measuring displacement of the outer race 130. In other embodiments, one of these sensors 304, 308 may be omitted. In the example embodiment, these sensors 304, 308 measure axial displacement of the respective races 128, 130 and are non-contact sensors. In other embodiments, the sensors 304, 308 may be configured and/or positioned differently to measure different types of movement of the fixed bearings 126. The sensors 304, 308 are communicatively coupled to a computing device 138 (shown in FIG. 1) by any suitable communication system (e.g., a wired and/or wireless network).

In the example embodiment, the sensors 304, 308 are optical sensors, e.g., cameras, and the fixed bearing box displacement sensor system 302 includes lasers 306 and 310 for combining with sensors 304, 308 to measure displacement of the fixed bearing 126. Alternatively, the sensors 304, 308, can be, for example and without limitation, inductive sensors, capacitive sensors, eddy current sensors, and any displacement sensor that enables the fixed bearing box displacement sensor system 302 to function as described herein.

In the example embodiment, at least one of the lasers 306, 310 is not attached to the wire saw 102, such that the laser 306 and/or 310 measures an absolute amount of displacement of the fixed bearing 126 relative to an external spatial reference system, i.e., a reference system different from a reference system of the wire saw 102. For example, as shown in FIG. 3, the laser 310 is attached to a reference surface 312 that is separate from the wire saw 102, such that the fixed bearing box displacement sensor system 302 can measure the absolute displacement of the fixed bearing 126, and thus an absolute movement of the fixed wall 134 of the frame 104. Moreover, in the example embodiment, at least one of the lasers 306, 310 is attached to the wire saw 102 such that the laser 306 and/or 310 measures a relative amount of displacement of the fixed bearing 126. For example, as shown in FIG. 3, the laser 306 is attached to a rear portion of the frame 104 such that the fixed bearing box displacement sensor system 302 can measure relative displacement of the fixed bearing 126, and thus a relative movement of the fixed wall 134 of the frame 104, relative to another portion of the frame 104.

In addition, in the example embodiment, the system 100 for controlling the surface profile of a wafer includes a head assembly displacement sensor system 314. For example, as shown in FIG. 3, the head assembly displacement sensor system 314 includes a displacement sensor 316 attached to the head assembly 110 for measuring movement and/or displacement of the head assembly 110. In the example embodiment, the sensor 316 is a non-contact sensor, and is communicatively coupled to the computing device 138 (shown in FIG. 1) by any suitable communication system (e.g., a wired and/or wireless network).

In the example embodiment, the sensor 316 is an optical sensor, e.g., a camera, and the head assembly displacement sensor system 314 includes laser 318 for measuring, in cooperation with sensor 316, a displacement of the head assembly 110. Alternatively, the sensor 316 can be, for example and without limitation, an inductive sensor, a capacitive sensor, an eddy current sensor, and any displacement sensor that enables the head assembly displacement sensor system 314 to function as described herein.

As discussed above with respect to the fixed bearing box displacement sensor system 302, in the example embodiment, the laser 318 is not attached to the wire saw 102. Thus, the head assembly displacement sensor system 314 measures an absolute amount of displacement of the head assembly 110 relative to a spatial reference system external to wire saw 102. For example, as shown in FIG. 3, the laser 318 is attached to a reference surface 320 that is separate from the wire saw 102, such that the head assembly displacement sensor system 314 can measure the absolute displacement of the head assembly 110.

Figure 4:
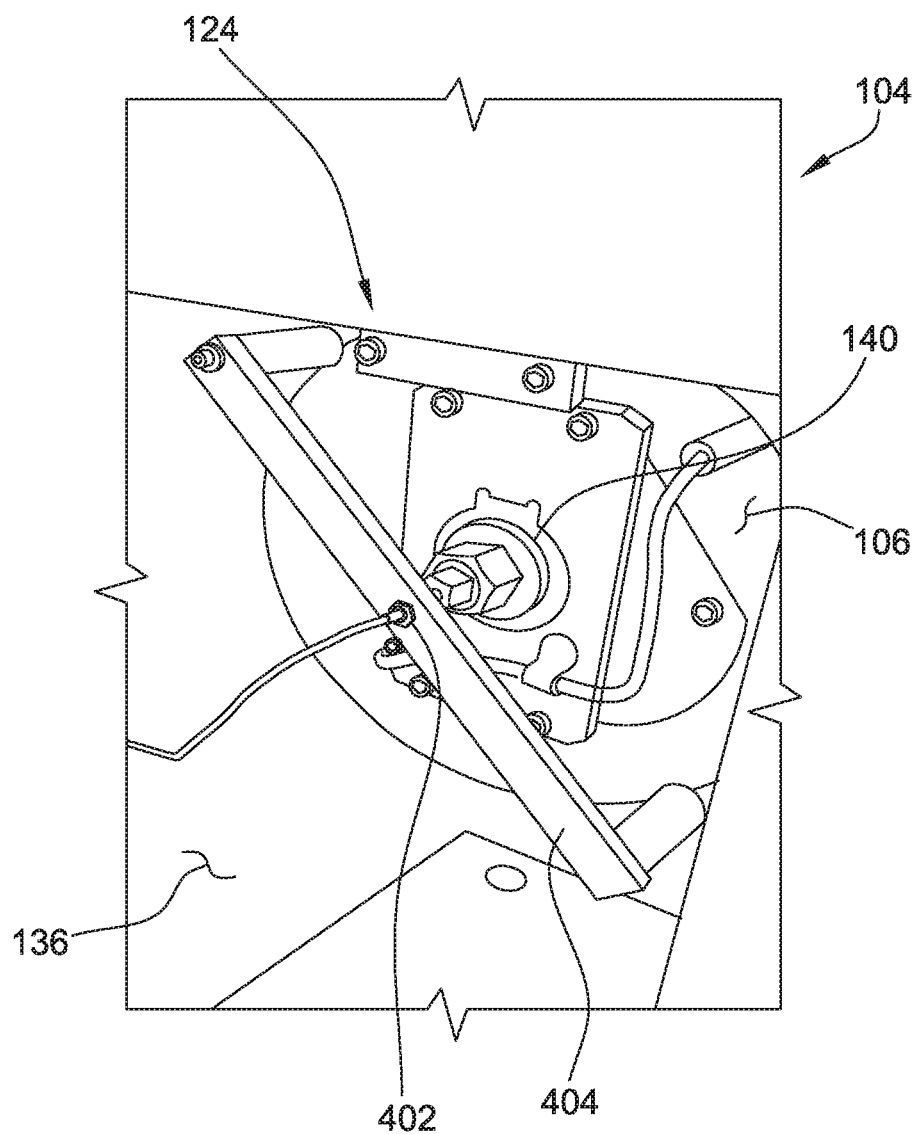
FIG. 4 is an enlarged view of a portion of the first side of the wire saw of FIG. 1.

FIG. 4 is an enlarged view of a portion of the first side of the wire saw 102 (shown in FIG. 1), showing one of the movable bearings 124 and a displacement sensor 402 for measuring an axial movement of the movable mearing 124, and thus the wire guide 106. The displacement sensor 402 is attached to a mounting bar 404, which is attached to the movable wall 136. The bar 404 facilitates locating the displacement sensor 402 proximate the inner shaft or bearing spindle 140 of the wire guide 106. In the example embodiment, the displacement sensor 402 measures a relative displacement between the movable wall 136 and the inner shaft or bearing spindle 140 of the wire guide 106. The displacement sensor 402 is communicatively coupled to the computing device 138 (shown in FIG. 1) by any suitable communication system (e.g., a wired and/or wireless network). In the example embodiment, the displacement sensor 402 is an inductive sensor. Alternatively, the displacement sensor 402 can be, for example and without limitation, a capacitive sensor, an eddy current sensor, an optical sensor, and any displacement sensor that enables the system 100 to function as described herein.

Figure 5:
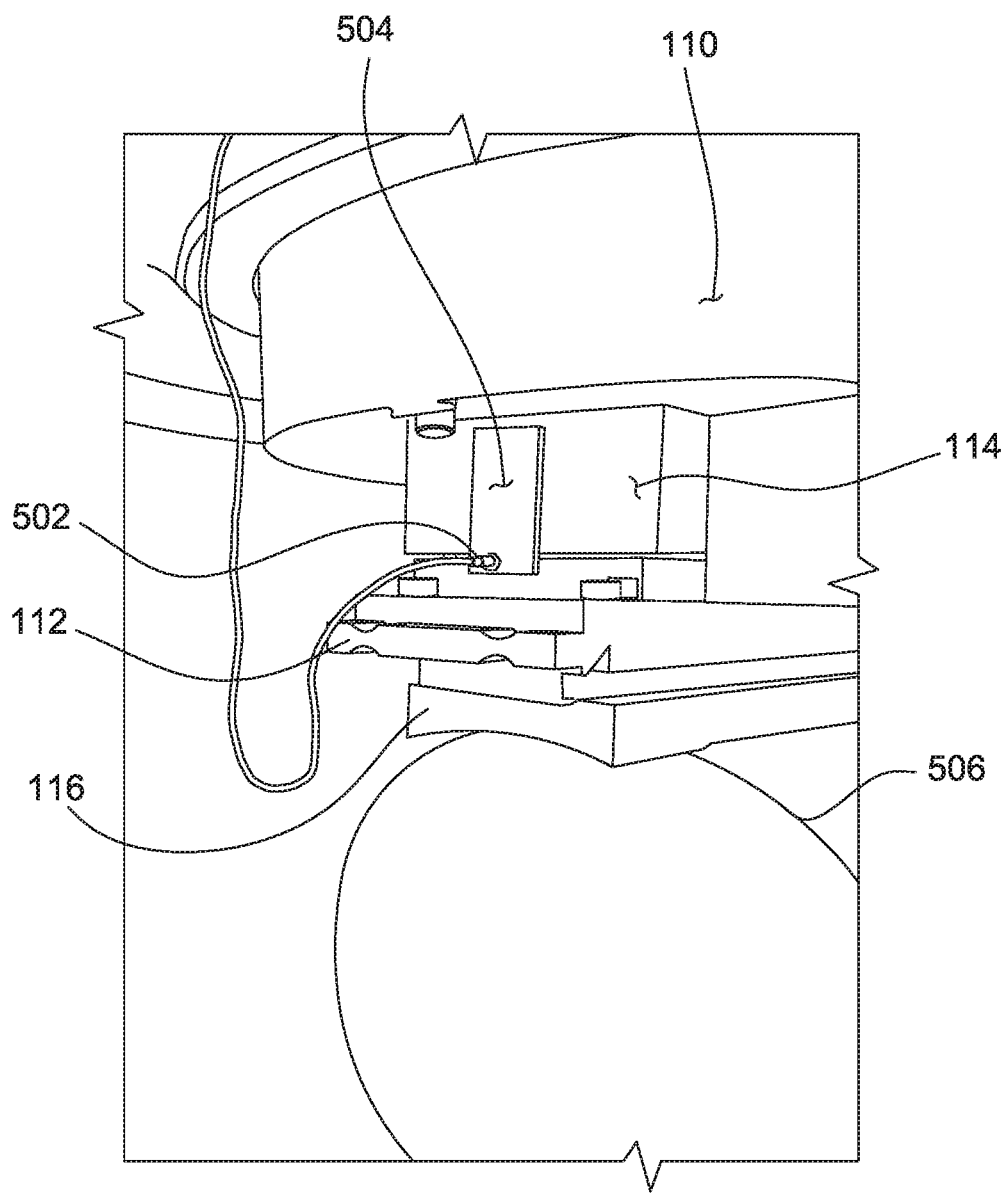
FIG. 5 is a perspective of a portion of a head assembly of the wire saw of FIG. 1.

FIG. 5 is a perspective view of a portion of the head assembly 110 of the wire saw 102 (shown in FIG. 1), showing the ingot holder 112 and a displacement sensor 502. In the example embodiment, the displacement sensor 502 is configured to measure a relative displacement between the ingot holder 112 and the head assembly 110. The displacement sensor 502 is attached to a reference plate 504. The reference plate 504 is attached to the table 114 of the head assembly 110. The displacement sensor 502 is communicatively coupled to the computing device 138 by any suitable communication system (e.g., a wired and/or wireless network). In the example embodiment, the displacement sensor 502 is an inductive sensor. Alternatively, the displacement sensor 502 can be, for example and without limitation, a capacitive sensor, an eddy current sensor, an optical sensor, and any displacement sensor that enables the system 100 to function as described herein.

Figure 6:
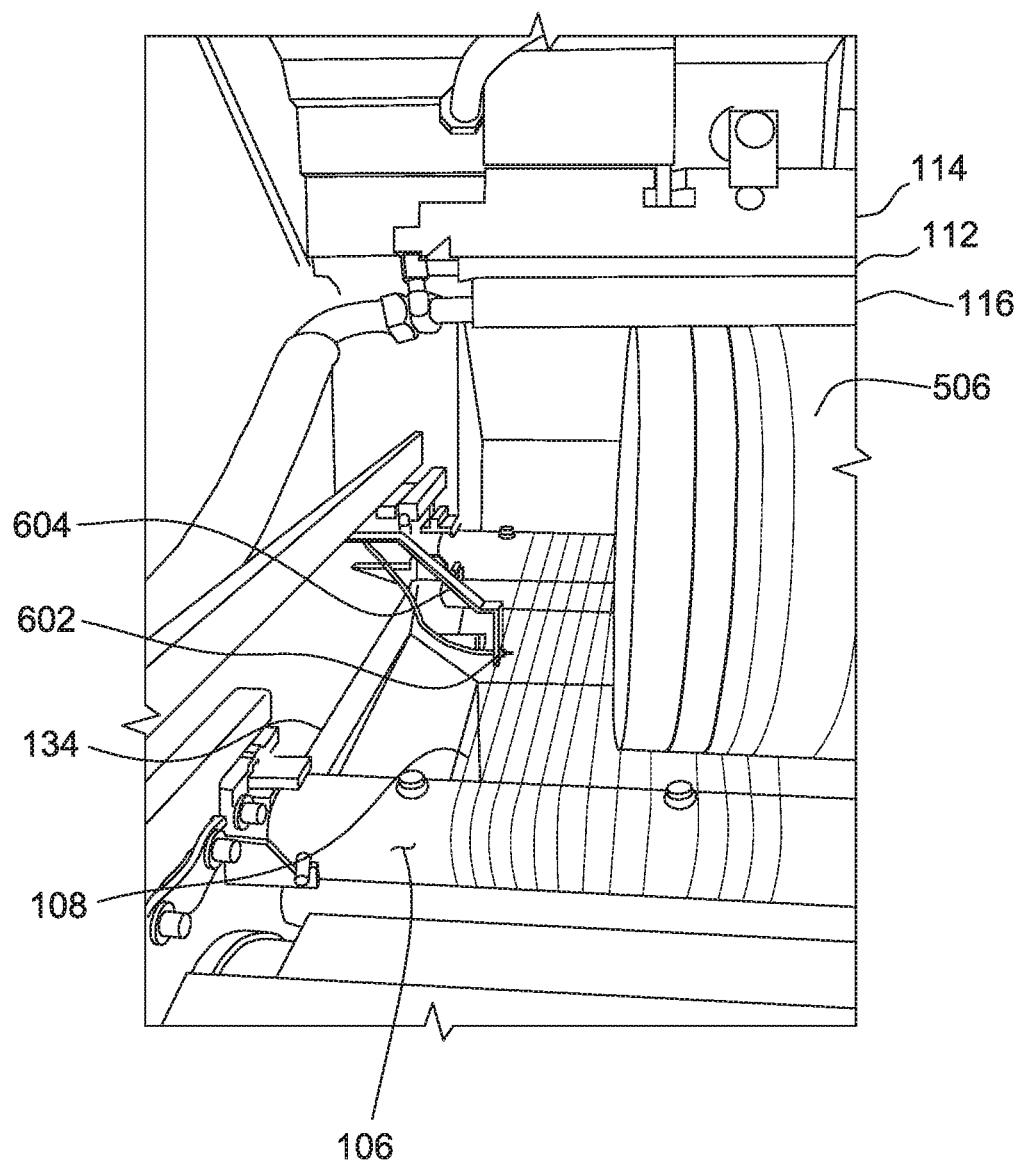
FIG. 6 is an enlarged perspective view of a portion of the wire saw of FIG. 1.

FIG. 6 is a perspective view of a portion of the wire saw 102 (shown in FIG. 1), showing the wire web 108 and a displacement sensor 602 for measuring a relative displacement between the fixed wall 134 and the wire web 108. In the example embodiment, the displacement sensor 602 is attached to a reference plate 604. The reference plate 604 is attached to the fixed wall 134 of the wire saw 102. The displacement sensor 602 is communicatively coupled to the computing device 138 by any suitable communication system (e.g., a wired and/or wireless network). In the example embodiment, the displacement sensor 602 is an inductive sensor. Alternatively, the displacement sensor 602 can be, for example and without limitation, a capacitive sensor, an eddy current sensor, an optical sensor, and any displacement sensor that enables the system 100 to function as described herein.

Figure 7:
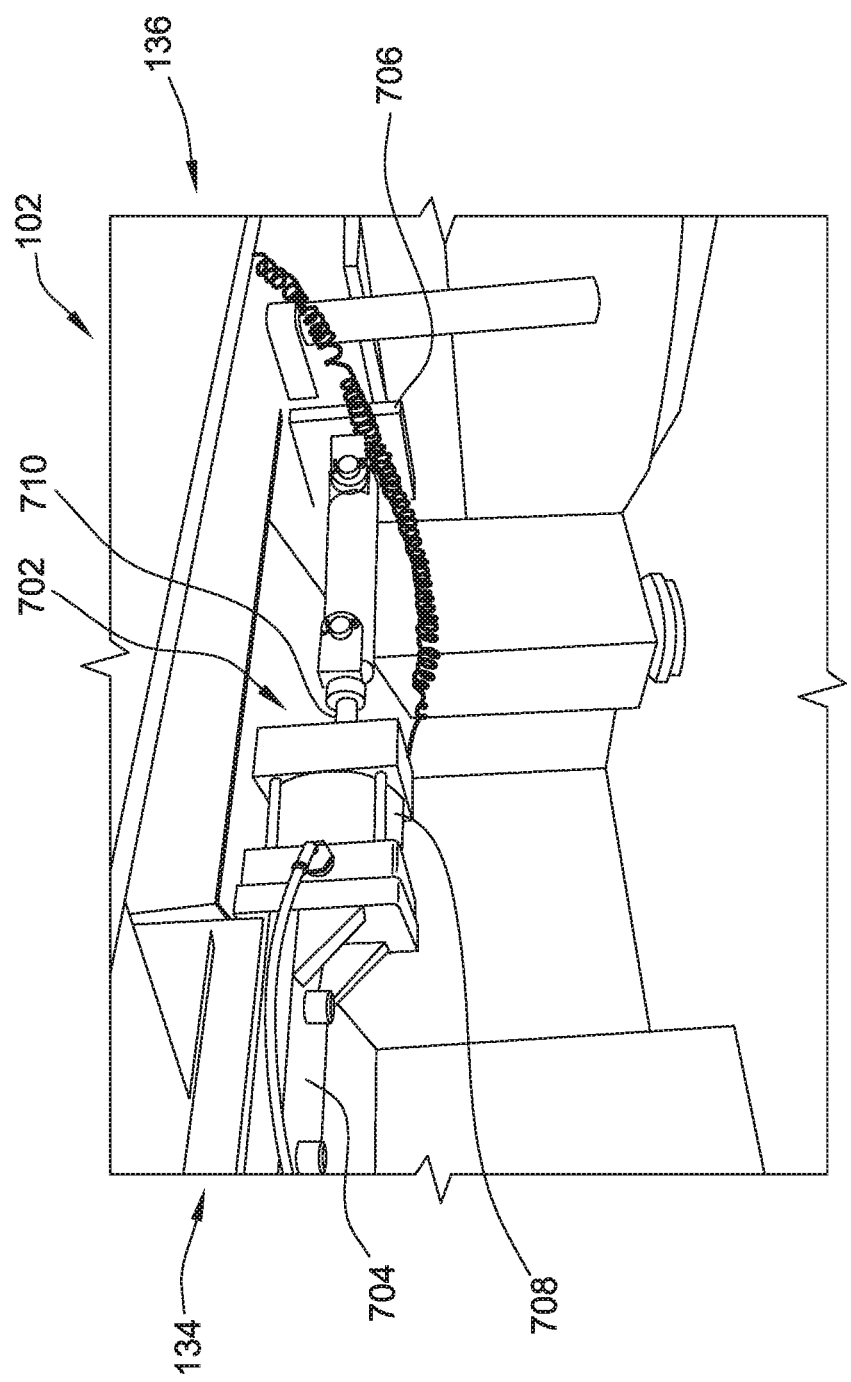
FIG. 7 is another enlarged perspective view of a portion of the wire saw of FIG. 1.

FIG. 7 is a perspective view of a portion of the wire saw 102 (shown in FIG. 1), showing a displacement device 702 for displacing a portion of the frame 104 of the wire saw 102. In the example embodiment, the displacement device 702 extends between the fixed wall 134 of the frame 104 and the movable wall 136 of the frame 104 to facilitate applying pressure to one or both of the sidewalls 134, 136 to counteract displacement during a cutting/slicing operation of the wire saw 102. A first mounting bracket 704 is attached to the fixed wall 134 of the wire saw 102. A second mounting bracket 706 is attached to the opposite side of the wire saw 102 and to the movable wall 136.

In the example embodiment the displacement device 702 is an air piston type device, including a piston cylinder 708 attached to the first mounting bracket 704, and a rod 710 attached to the second mounting bracket 706. Compressed air is injected into the piston cylinder 708 to extend the rod 710, and thus apply pressure to the sidewalls 134, 136. The pressure from the displacement device 702 causes the sidewalls 134, 136 to move relative to each other. Likewise, compressed air is removed from the piston cylinder 708 to relieve the pressure. The sidewalls 134, 136 move back to their resting positions, applying pressure to the displacement device 702. The pressure from the sidewalls 134, 136 causes the rod 710 to retract into at least a portion of the piston cylinder 708. Additionally, in some embodiments, air pressure may be applied to the opposite side of the piston to cause the rod 710 to retract and pull the sidewalls towards one another. In alternative embodiments, the displacement device 702 can be, for example, a hydraulic device, an electro-mechanical actuator, or any other displacement device that enables the system 100 to function as described herein. In the example embodiment, the displacement device 702 is communicatively coupled to the computing device 138 by any suitable communication system (e.g., a wired and/or wireless network).

Figure 8:
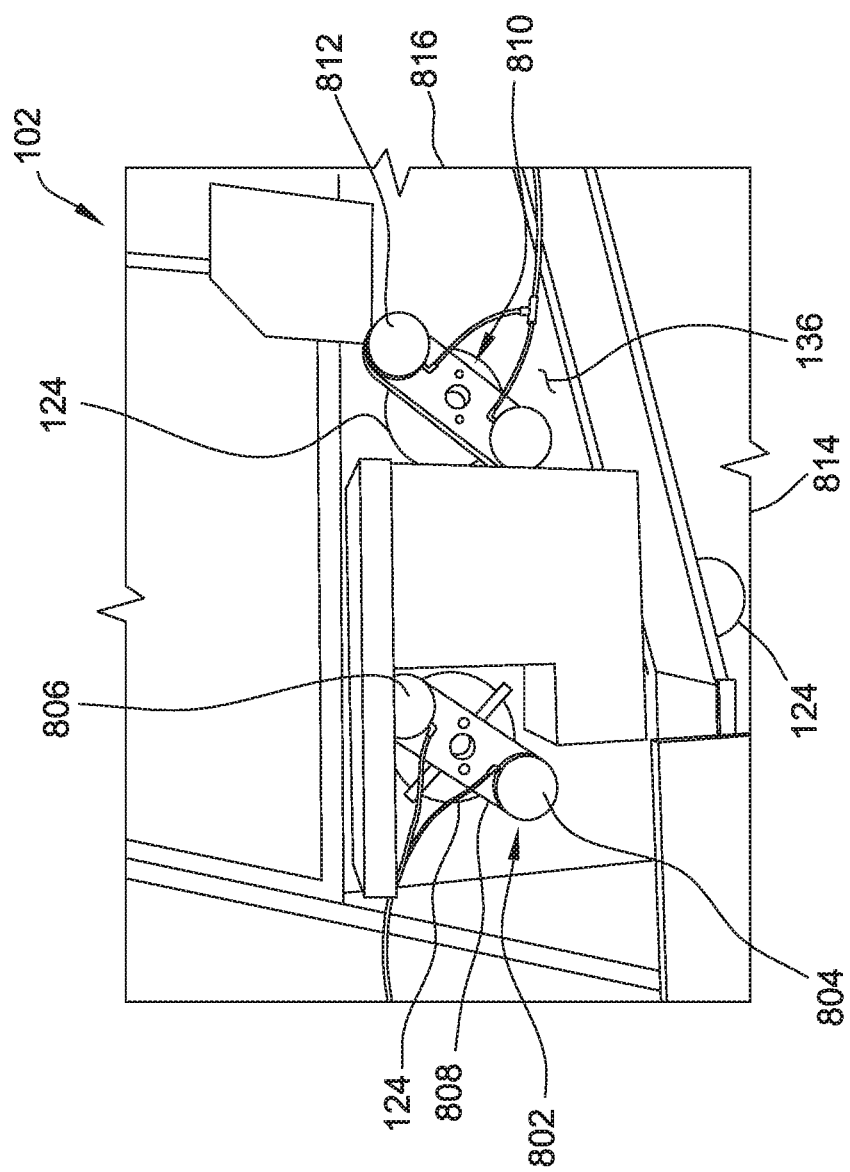
FIG. 8 is an enlarged side view of the first side of the wire saw of FIG. 1.

FIG. 8 is a side view of a portion of the first side of the wire saw 102 (shown in FIG. 1), showing displacement devices 802 and 810 attached to the uppermost movable bearings 124 of the wire saw 102, respectively. In the example embodiment, displacement devices 802 and 810 are substantially the same and attached to movable bearings 124 in substantially the same manner. Thus, displacement device 802 will be described herein in detail, and the description is likewise applicable to displacement device 810.

In the example embodiment, displacement device 802 is attached to movable wall 136 and one of movable bearings 124 (the upper forward most movable bearing 124, for example). The displacement device 802 includes a first displacement component 804 and a second displacement component 806 spaced from the first displacement component 804. As shown in FIG. 8, the displacement components 804, 806 are attached to a frame 808, which is attached to the movable bearing 124 and the bearing spindle 140 of the wire guide 106. The first displacement component 804 and second displacement component 806 apply pressure to the movable wall 136 to facilitate displacing the movable bearing 124 relative to the movable wall 136. In the example embodiment, the first displacement component 804 and second displacement component 806 are diametrically opposite each other in reference to the movable bearing 124 to facilitate applying a substantially axial displacement of the movable bearing 124 relative to the movable wall 136.

In the example embodiment, the first displacement component 804 and the second displacement component 806 of the displacement device 802 are air piston type devices. Compressed air is injected into the piston cylinders to extend the pistons and apply pressure to the movable wall 136. The pressure from the first and second displacement devices 804, 806 causes the movable bearing 124 to move relative to the movable wall 136. In some embodiments, the pressure from the first and second displacement devices 804, 806 may cause the movable bearing 124 to move, thus causing a similar displacement to the fixed wall 134 coupled to the opposite end of the wire guide 106. Likewise, compressed air is removed from the first and second displacement devices 804, 806 to relieve the pressure therein. The movable wall 136 thus moves back to its resting position. Additionally, in some embodiments, air pressure may be applied to the opposite side of the pistons to cause the air pistons to retract and the movable bearing 124 to move in the opposite direction relative to the movable wall 136. In alternative embodiments, the first and second displacement devices 804, 806 can be, for example, a hydraulic device, an electro-mechanical actuator, or any other displacement device that enables the system 100 to function as described herein. In the example embodiment, the displacement device 802 is communicatively coupled to the computing device 138 by any suitable communication system (e.g., a wired and/or wireless network).

With reference back to FIG. 1, in the example embodiment, the computing device 138 is communicatively coupled to the displacement sensors 304, 306, 308, 310, 316, 402, 502, and 602, and the displacement devices 702, 802, and 810. For predictive control, the computing device 138 is configured for receiving an input from a user identifying displacement data associated with a displacement of the wire saw 102 during a cutting operation. Based on this input, the computing device communicates instructions to the displacement devices 702, 802, and/or 810 to facilitate counteracting displacement of the wire saw 102 represented by the displacement data. In addition, for reactive control, the computing device 138 is configured for receiving real-time input from the displacement sensors 304, 306, 308, 310, 316, 402, 502, and 602 during a cutting operation. Based on this real-time input, the computing device communicates instructions to the displacement devices 702, 802, and/or 810 to facilitate counteracting displacement of the wire saw 102 represented by the input displacement of the wire saw during the cutting operation. The displacement devices 702, 802, and 810 alter the displacement of the fixed and movable walls 134, 136, and/or the movable bearings 124, and thereby alter the displacement of the wire guides 106 and wires 118. Control of the displacement of the wire guides 106 and wires 118 controls the shape of the surfaces of the wafers (not shown), which in turn controls the warp of the wafer surfaces.

In the example embodiment, the computing device 138 generates and implements various control algorithms and techniques to control system 100, e.g., displacement sensors 304, 306, 308, 310, 316, 402, 502, and 602, and the displacement devices 702, 802, and 810. The computing device 138 includes a processor 142 for executing instructions. In some embodiments, executable instructions are stored in a memory device 144. Processor 142 includes one or more processing units (e.g., in a multi-core configuration). Memory device 144 is any device allowing information such as executable instructions and/or other data to be stored and retrieved. Memory device 144 stores parameters for controlling the operation of the system 100, as described in more detail herein. Memory device 144 includes one or more computer-readable media.

In the exemplary embodiment, the computing device 138 is configured to enable communication through a short range wireless communication protocol such as Bluetooth™ or Z-Wave™, through a wireless local area network (WEAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)), or a wired connection (i.e., one or more conductors for transmitting electrical signals).

The computing device 138 may include a user input interface 146 for receiving input from the user. The user input interface 146 may include, for example, without limitation, one or more buttons, a keypad, a touch sensitive panel (e.g., a touch pad or a touch screen), and/or a microphone. A single component such as a touch screen may function as both an output device and the user input interface 146.

Figure 9A:
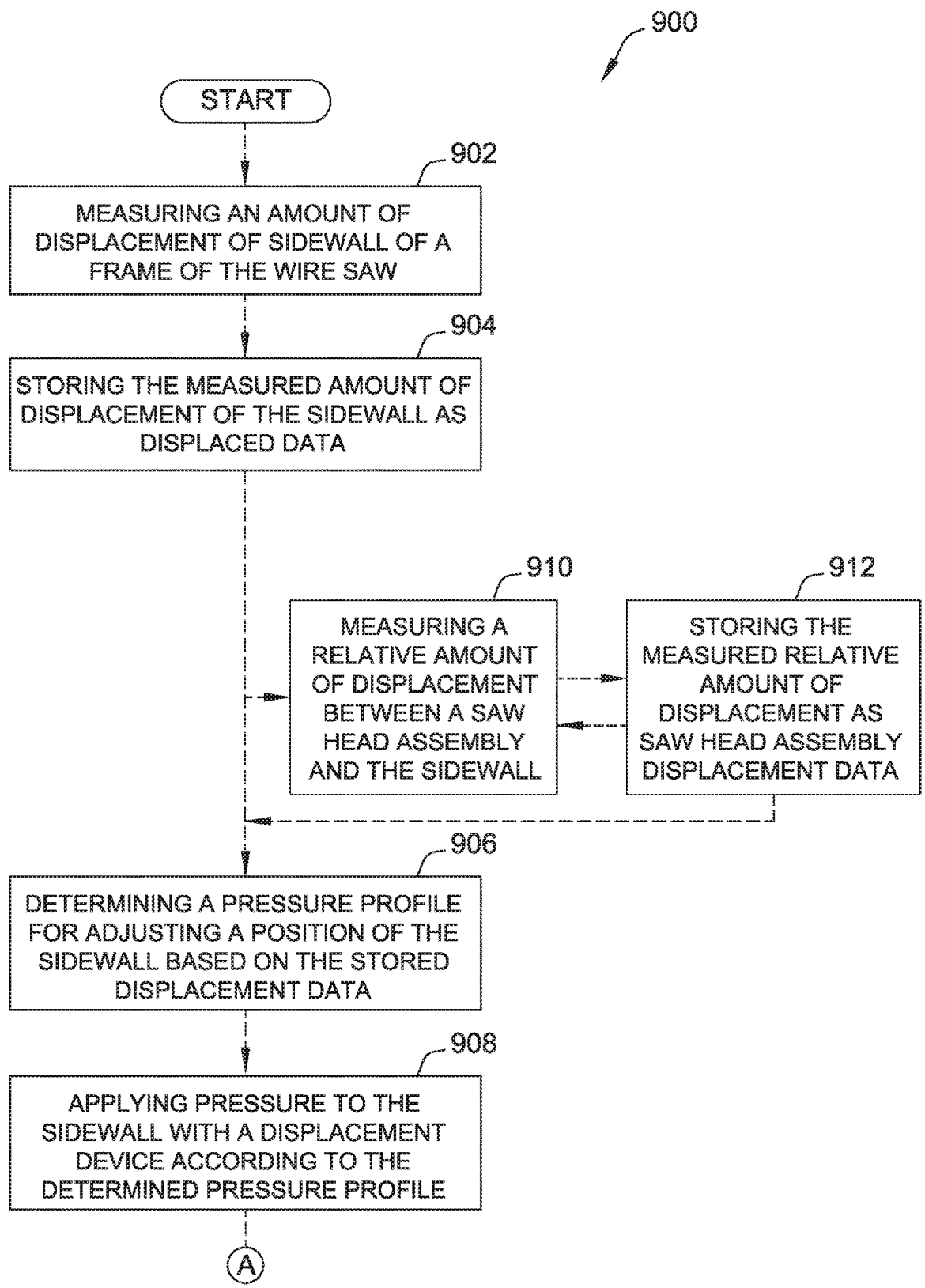
FIG. 9A is a flow diagram of an example method for controlling a surface profile of a wafer sliced from an ingot with the wire saw of FIG. 1.
Figure 9B:
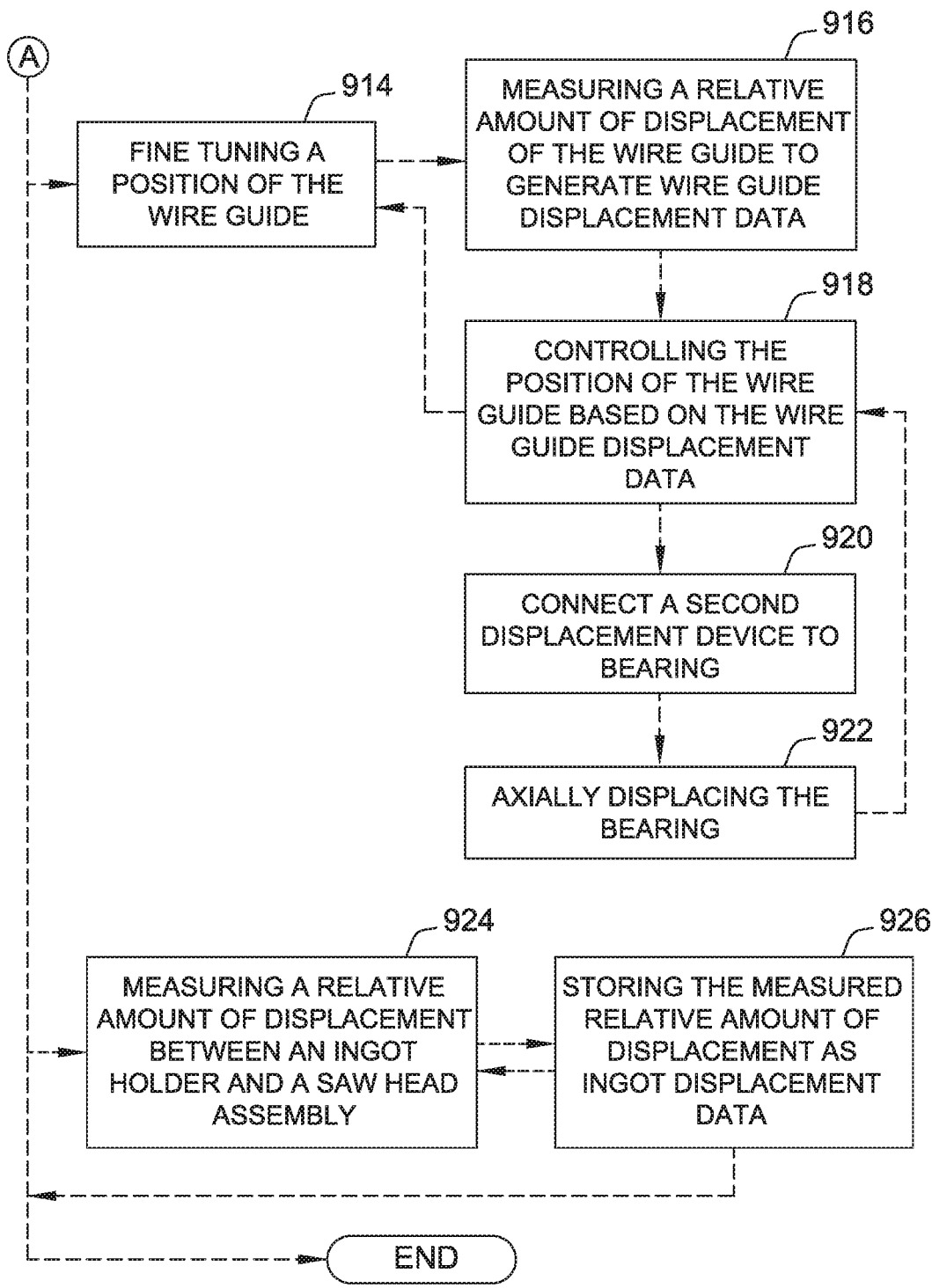
FIG. 9B is a continuation of the flow diagram of FIG. 9A.

An example method 900 for controlling a surface profile of a wafer (not shown) sliced from the ingot 506 (shown in FIG. 5) with a wire saw 102 (shown in FIG. 1) is shown in a flow diagram in FIGS. 9A and 9B. The method 900 is representative of a predictive control process, which as discussed above, is based on an historical performance of the wire saw 102. With reference to FIGS. 1-9, the method 900 includes measuring 902 an amount of displacement of a sidewall, such as fixed wall 134 or movable wall 136, of the frame 104 of the wire saw 102 during a series of cutting operations. In some embodiments, this may include measuring the relative amount of displacement between the bearings 124 and/or 126 and the sidewalls 134 and/or 136. As described herein, the fixed wall 134 is attached to the fixed bearings 126 and the movable wall 136 is attached to the movable bearings 124 of the wire guides 106. The wire guides 106 support the wire web 108 in the wire saw 102.

Additionally, the method 900 includes storing 904 the measured amount of displacement of the fixed wall 134 and/or movable wall 136 as historical displacement data. The method 900 also includes determining 906 a pressure profile for adjusting a position of one or more of the fixed wall 134 and movable wall 136 based on the stored historical displacement data of the sidewalls. In addition, the method 900 includes applying 908 pressure to the fixed wall 134 and/or movable wall 136 with a displacement device, such as displacement device 702, according to the determined pressure profile to control the position of the fixed wall 134 and/or movable wall 136.

In some example embodiments, the method 900 includes measuring 910 a relative amount of displacement between the head assembly 110 of the wire saw 102 and the fixed wall 134 and/or movable wall 136 during the series of cutting operations. Furthermore, such embodiments include storing 912 the measured relative amount of displacement as historical saw head assembly displacement data. The pressure profile for adjusting a position of the fixed wall 134 and/or movable wall 136 is further based on the stored historical saw head assembly displacement data.

In some other example embodiments, the method 900 includes fine tuning 914 a position of the wire guide 106. This includes measuring 916 a relative amount of displacement between the wire guide 106 and the fixed wall 134 and/or movable wall 136 during the series of cutting operations to generate historical wire guide displacement data. In addition, this includes controlling 918 the position of the wire guide 106 based on the historical wire guide displacement data. Moreover, the system 100 may include a second displacement device, such as displacement device 802 and/or 810. In such an embodiment, controlling 918 the position of the wire guide 106 can include connecting 920 the second displacement device 802 and/or 810 to the bearings 124, 126 of a wire guide 106, and axially displacing 922 the bearings 124, 126 relative to the frame 104 of the wire saw 102 with the second displacement device 802 and/or 810.

In still other embodiments, the method 900 may include measuring 824 a relative amount of displacement between the ingot holder 112 and a saw head assembly 110 of the wire saw 102 during the series of cutting operations, and storing 826 the measured relative amount of displacement as historical ingot displacement data. The pressure profile for adjusting a position of the sidewalls 134 and/or 136 is further based on the stored historical ingot displacement data.

In some embodiments, the displacement data of the fixed wall 134 and/or movable wall 136 may be updated after slicing operations by measuring the surfaces of the wafers sliced from the ingot 506. For example, the surface of the wafers may be measured and compared to a desired wafer shape and/or surface profile. If the measurements of the surface differ, the historical displacement data may be updated.

Figure 10A:
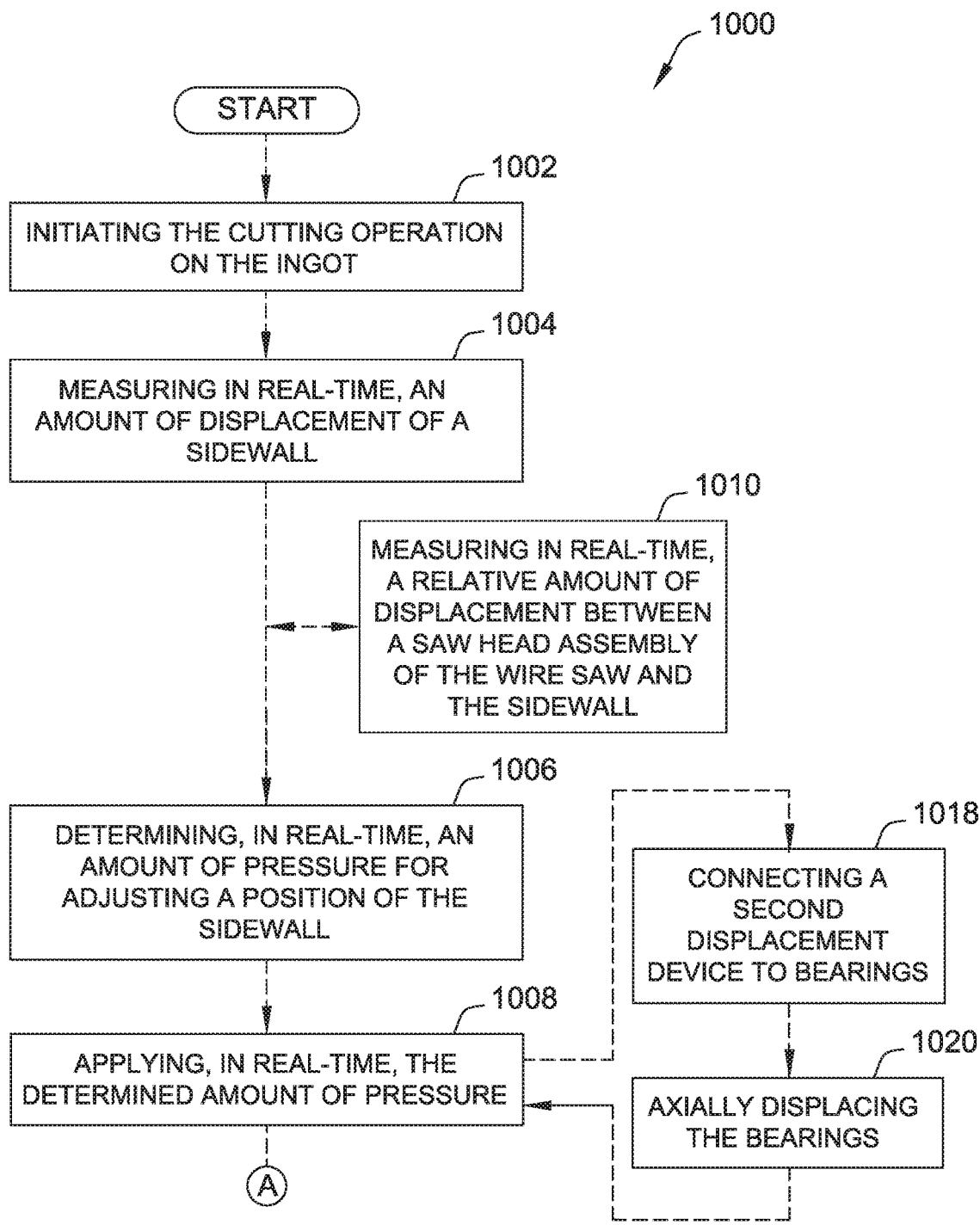
FIG. 10A is a flow diagram of another example method for controlling a surface profile of a wafer.
Figure 10B:
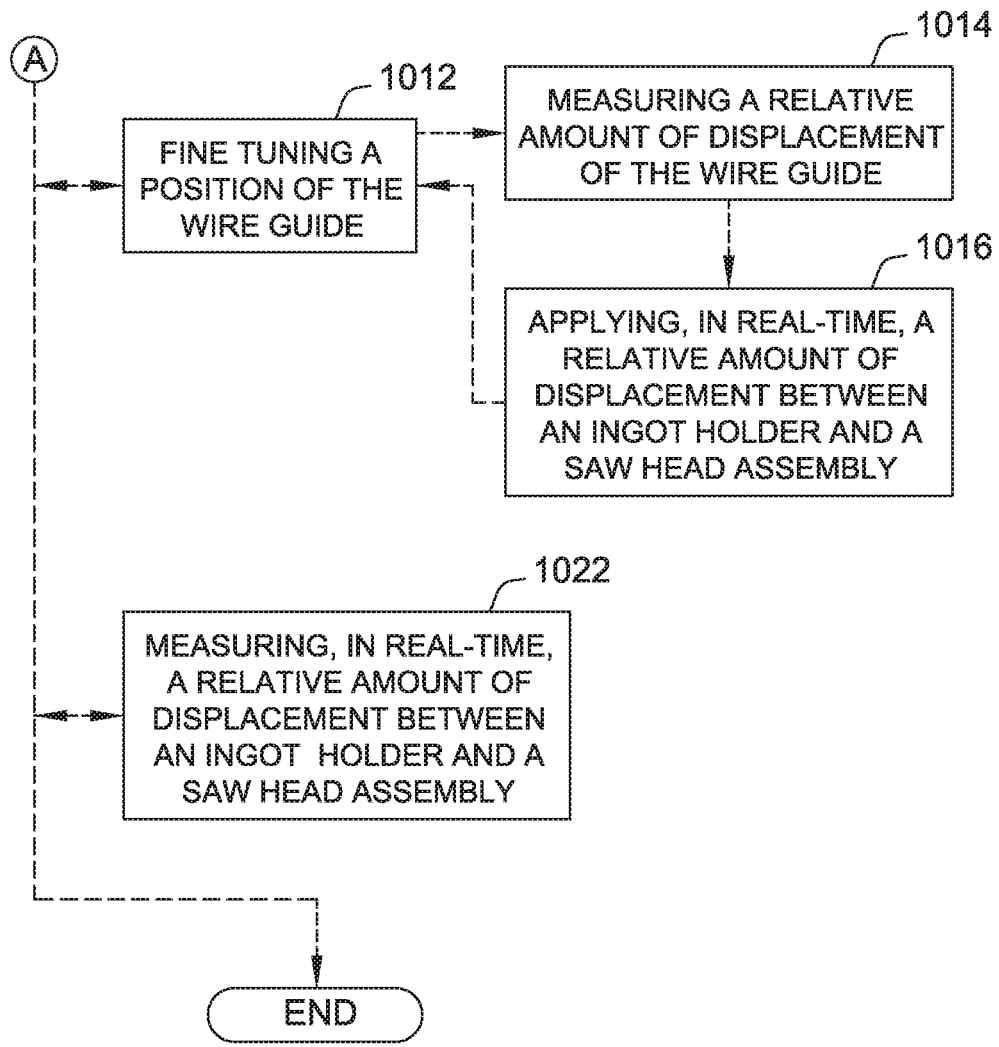
FIG. 10B is a continuation of the flow diagram of FIG. 10A.

An example method 1000 for controlling a surface profile of a wafer (not shown) during a cutting operation of the ingot 506 (shown in FIG. 5) is shown in a flow diagram in FIGS. 10A and 10B. The method 1000 is representative of a reactive control process, which as discussed above, is based on real-time performance of the wire saw 102. With reference to FIGS. 1-8 and 10, the method 1000 includes initiating 1002 the cutting operation on the ingot 506 using the wire saw 102 to produce the wafer. Additionally, the method 1000 includes measuring 1004, in real-time during the cutting operation, an amount of displacement of a sidewall, such as fixed wall 134 and/or movable wall 136, of a frame 104 of the wire saw 102. The sidewalls 134, 136 are connected to a bearing 126, 124, respectively, of a wire guide 106 supporting a wire web 108 in the wire saw 102.

In addition, the method 1000 includes determining 1006, in real-time during the cutting operation, an amount of pressure for adjusting a position of the fixed wall 134 and/or movable wall 136 based on the measured amount of displacement of the fixed wall 134 and/or movable wall 136. Moreover, the method 1000 includes applying 1008, in real-time during the cutting operation, the determined amount of pressure to the fixed wall 134 and/or movable wall 136 with a displacement device, such as displacement device 702. The determined amount of pressure facilitates counteracting the measured amount of displacement of the fixed wall 134 and/or movable wall 136, i.e., reducing or eliminating the displacement and ameliorating the negative effects that such displacement can have on the surface profile of the wafers.

Alternatively or additionally, the method 1000 includes measuring 1010 in real-time during the cutting operation, a relative amount of displacement between a saw head assembly 110 of the wire saw 102 and the fixed wall 134 and/or movable wall 136, wherein determining 1006 the amount of pressure for adjusting the position of the fixed wall 134 and/or movable wall 136 is further based on the measured relative amount of displacement of the saw head assembly 110.

The method 1000 may also include fine tuning 1012 a position of the wire guide 106 in real-time during the cutting operation. This can include measuring 1014, in real-time during the cutting operation, a relative amount of displacement between the wire guide 106 and the fixed wall 134 and/or movable wall 136, and applying 1016, in real-time during the cutting operation, an amount of pressure to the wire guide 106 to facilitate counteracting the measured amount of displacement of the wire guide 106.

In some embodiments, the system 100 may include a second displacement device, such as displacement devices 802 and/or 810. In such embodiments, applying 1008, in real-time during the cutting operation, the determined amount of pressure to the fixed wall 134 and/or movable wall 136 can include connecting 1018 the second displacement device 802 and/or 810 to the bearings 124, 126 of a wire guide 106, and operating 1020 the second displacement device 802 and/or 810 to axially displace the bearings 124, 126 relative to the frame 104 of the wire saw 102.

In other alternative embodiments, the method 1000 includes measuring 1022, in real-time during the cutting operation, a relative amount of displacement between the ingot holder 112 and the saw head assembly 110 of the wire saw 102. The amount of pressure for adjusting the position of the fixed wall 134 and/or movable wall 136 is further based on the measured relative amount of displacement of the ingot holder relative to the saw head assembly.

Figure 11:
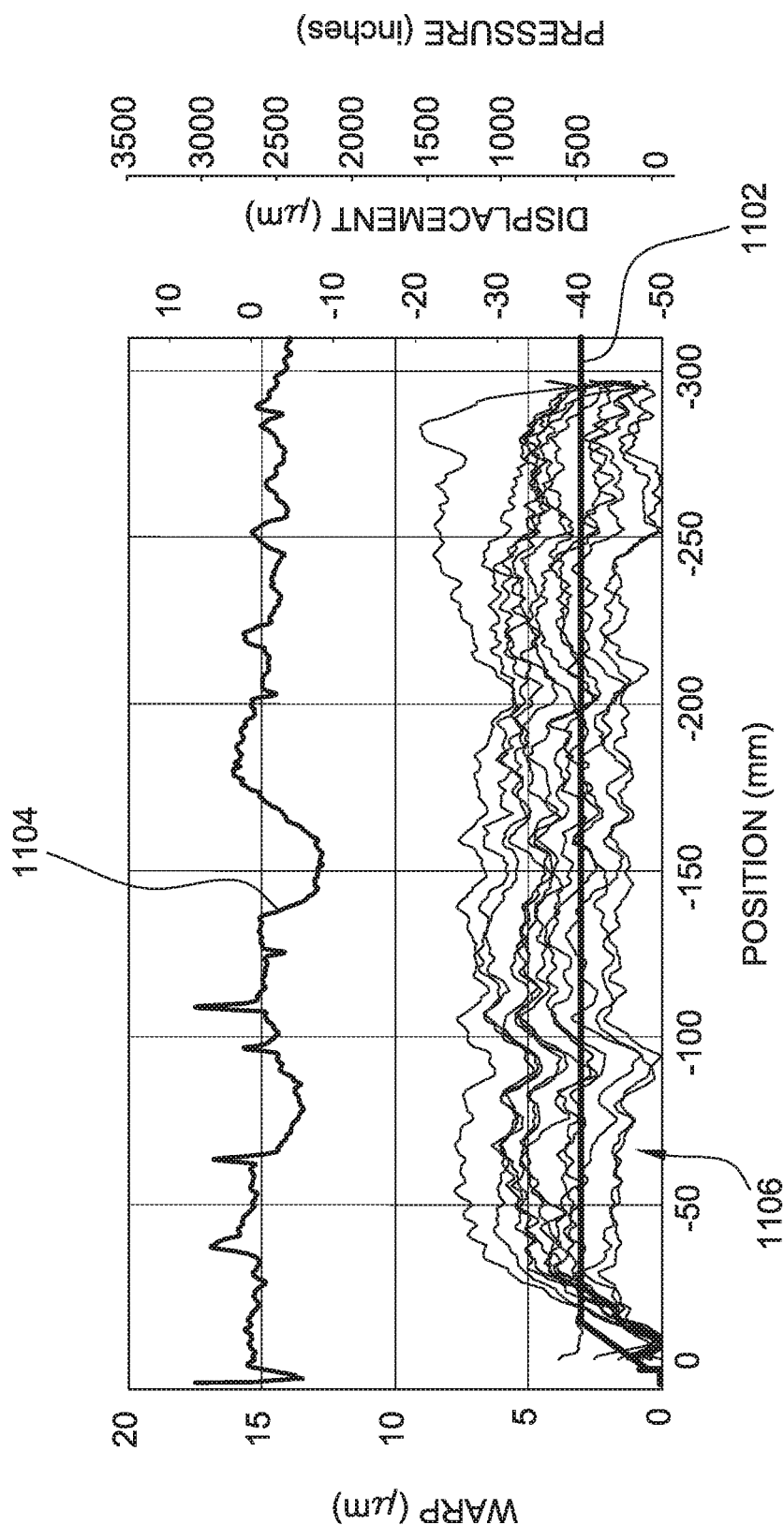
FIG. 11 is a graph illustrating predictive control of displacement of a fixed wall of the wire saw of FIG. 1 during a cutting operation.

The systems and methods described herein facilitate controlling the surface profile of wafers cut in the wire saw 102. It has been determined that in prior systems, the frame 104 of the wire saw 102 is subject to displacement or movement during cutting or slicing of the ingot 506. FIG. 11 is a graph illustrating predictive control of displacement of the fixed wall 134 during a cutting operation. As shown in the graph of FIG. 11, the pressure 1102 applied by displacement device 702 to fixed wall 134 is initially zero at position zero millimeters, rising in a generally linear slope to about 500 millibars at a position of about −15 millimeters. In this example, the pressure 1102 is maintained at about 500 millibars during the remaining portion of the cutting operation. The measured displacement 1104 of the fixed wall 134, after initially changing sharply, is altered to about zero displacement during the initial application of pressure from displacement device 702. The measured displacement 1104 of the fixed wall 134 remains within a range of about 8 micrometers to about −10 micrometers during the remaining portion of the cutting operation. Lines 1106 show that the profile of the wafers during the slicing operation is limited to a range of about 0 micrometers to about 8 micrometers.

Figure 12:
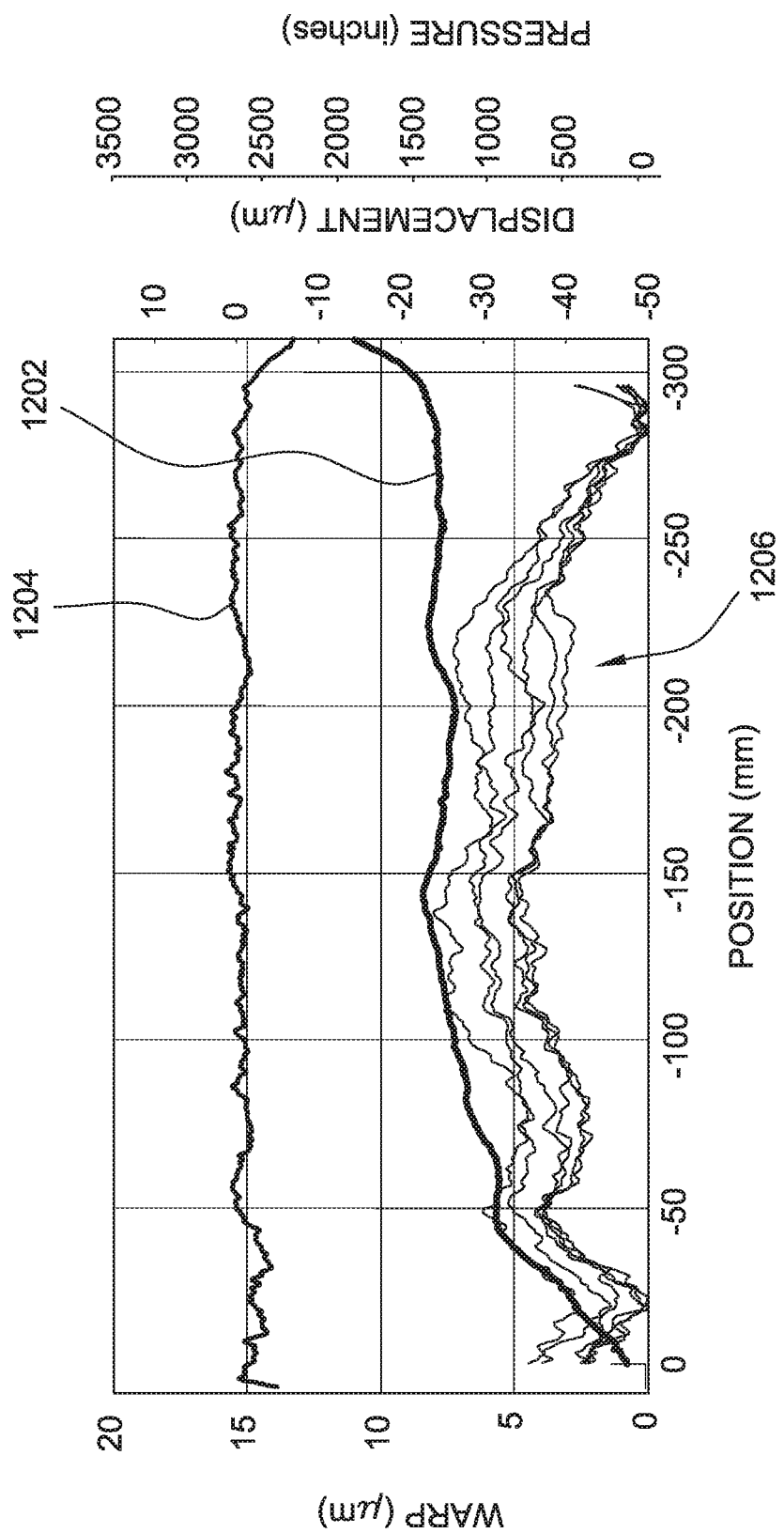
FIG. 12 is a graph illustrating reactive control of displacement of a fixed wall of the wire saw of FIG. 1 during a cutting operation.

FIG. 12 is a graph illustrating reactive control of displacement of the fixed wall 134 during a cutting operation. As shown in the graph of FIG. 12, the pressure 1202 applied by displacement device 702 to fixed wall 134 changes based on the measured displacement 1204 of the fixed wall 134, thus the actual displacement of the fixed wall 134 may remain relatively constant during slicing of the ingot 506 by the wire saw 102. For example, as shown in FIG. 12, the pressure 1202 generally rises from an initial pressure of zero and a position of zero millimeters in the cutting operation, to about a pressure of 1500 millibars at a position of −300 millimeters in the cutting operation. The lines 1206 show that the surface profile measurements of the wafers during the slicing operation are limited to a range of about 0 micrometers to about 8 micrometers.

By measuring the displacement of the fixed wall 134 of the wire saw 102 and applying a counteracting pressure to the wall, the systems and methods described herein control the surface profile of the wafers. Accordingly, the displacement of the fixed wall 134 can be reduced or eliminated by applying such pressure using a displacement device. By doing this, the displacement of the wire guides 106 and wires 118 can be reduced or eliminated as well. As such, the surface profile of the wafers and/or their warp can be more precisely controlled. This enhanced control over surface profile and wafer warp increases the yield of the wafer manufacturing process. Furthermore, downstream processing operations (e.g., double-side grinding) may be reduced in duration or eliminated, thus reducing the time and cost of manufacturing the wafers.

When introducing elements of the present disclosure or the embodiments thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the present disclosure, it is intended that all matter contained in the above description and shown in the accompanying drawings shall be interpreted as illustrative and not in a limiting sense.

What is claimed is:

1. A method for controlling a surface profile of a wafer sliced from an ingot with a wire saw, the method comprising:
   measuring an amount of displacement of a sidewall of a frame of the wire saw, the sidewall connected to a bearing of a wire guide supporting a wire web in the wire saw;
   determining a pressure profile for adjusting a position of the sidewall based on measured amount of displacement of the sidewall; and applying pressure to the sidewall with a mechanical actuator according to the determined pressure profile to control the position of the sidewall.

2. The method of claim 1, wherein measuring an amount of displacement of a sidewall comprises measuring a relative amount of displacement of the sidewall relative to another portion of the wire saw frame.

3. The method of claim 1 further comprising fine tuning a position of the wire guide comprising:
measuring a relative amount of displacement between the wire guide and the sidewall to generate wire guide displacement data; and
controlling the position of the wire guide based on the wire guide displacement data.

4. The method of claim 3, wherein the mechanical actuator is a first mechanical actuator, and wherein controlling the position of the wire guide comprises:
connecting a second mechanical actuator to the bearing of a wire guide; and
axially displacing the bearing relative to the frame of the wire saw with the second mechanical actuator.

5. The method of claim 1 further comprising measuring a relative amount of displacement between an ingot holder and a saw head assembly of the wire saw, wherein determining a pressure profile for adjusting a position of the sidewall is further based on the measured ingot displacement data.

6. The method of claim 1, wherein measuring an amount of displacement of a sidewall comprises measuring an absolute amount of displacement of the sidewall relative to an external spatial reference system.

7. The method of claim 1, wherein measuring an amount of displacement of a sidewall comprises measuring a relative amount of displacement between the bearing and the sidewall.

8. The method of claim 1, wherein the mechanical actuator comprises at least one of an air piston, a hydraulic actuator, and an electro-mechanical actuator.

9. A method for controlling a surface profile of a wafer during a cutting operation of an ingot, the method comprising:
initiating the cutting operation on the ingot using a wire saw to produce the wafer;
measuring, in real-time during the cutting operation, an amount of displacement of a sidewall of a frame of the wire saw, the sidewall connected to a bearing of a wire guide supporting a wire web in the wire saw; and
applying, in real-time during the cutting operation, an amount of pressure to the sidewall with a mechanical actuator based on the measured amount of displacement of the sidewall, wherein application of the amount of pressure facilitates counteracting the measured amount of displacement of the sidewall.

10. The method of claim 9 further comprising measuring, in real-time during the cutting operation, a relative amount of displacement between a saw head assembly of the wire saw and the sidewall, wherein applying the amount of pressure to the sidewall is further based on the measured relative amount of displacement of the saw head assembly.

11. The method of claim 9 further comprising fine tuning a position of the wire guide in real-time during the cutting operation comprising:
measuring, in real-time during the cutting operation, a relative amount of displacement between the wire guide and the sidewall; and
applying, in real-time during the cutting operation, an amount of pressure to the wire guide to facilitate counteracting the measured amount of displacement of the wire guide.

12. The method of claim 11, wherein the mechanical actuator is a first mechanical actuator, and wherein applying, in real-time during the cutting operation, an amount of pressure to the wire guide comprises:
connecting a second mechanical actuator to the bearing of a wire guide; and
operating the second mechanical actuator to axially displace the bearing relative to the frame of the wire saw.

13. The method of claim 9 wherein measuring, in real-time during the cutting operation, an amount of displacement of a sidewall comprises measuring a relative amount of displacement of the sidewall relative to another portion of the wire saw frame.

14. A system for controlling a surface profile of a wafer sliced from an ingot with a wire saw, the system comprising:
a sensor for measuring an amount of displacement of a sidewall of a frame of the wire saw, the sidewall connected to a bearing of a wire guide supporting a wire web in the wire saw;
a mechanical actuator connected to the sidewall; and
a computing device connected in communication to the sensor and the mechanical actuator, the computing device comprising a memory and a processor, the processor configured to:
receive, in real-time during a cutting operation, the measured amount of displacement of the sidewall from the sensor; and
transmit, in real-time during the cutting operation, a control signal to the mechanical actuator to apply an amount of pressure to the sidewall with the mechanical actuator based on the measured amount of displacement of the sidewall to control a position of the sidewall.

15. The system of claim 14 further comprising a saw head assembly and a saw head assembly sensor for measuring a relative amount of displacement between the saw head assembly and the sidewall.

16. The system of claim 15, wherein the processor is further configured to:
receive the measured relative amount of displacement; and
transmit the control signal to the mechanical actuator based on the measured relative amount of displacement.

17. The system of claim 14 further comprising:
a wire guide sensor for measuring a relative amount of displacement between the wire guide and the sidewall; and
a bearing mechanical actuator connected to the bearing of a wire guide.

18. The system of claim 17, wherein the processor is further configured to transmit a control signal to the bearing mechanical actuator to control the position of the wire guide based on the measured relative amount of displacement.

19. The system of claim 14, wherein the sensor is connected to the bearing for measuring a relative amount of displacement between an inner race and an outer race of the bearing.

20. The system of claim 14, wherein the sensor is connected to the bearing for measuring a relative amount of displacement between an inner shaft of the bearing and the sidewall.

21. The system of claim 14, wherein the sensor is connected to the sidewall for measuring an absolute amount of displacement of the sidewall relative to an external spatial reference system.

22. The system of claim 14 in combination with a wire saw including a frame, a sidewall, a wire guide, and a wire web.

\* \* \* \* \*